Patented Sept. 10, 1940

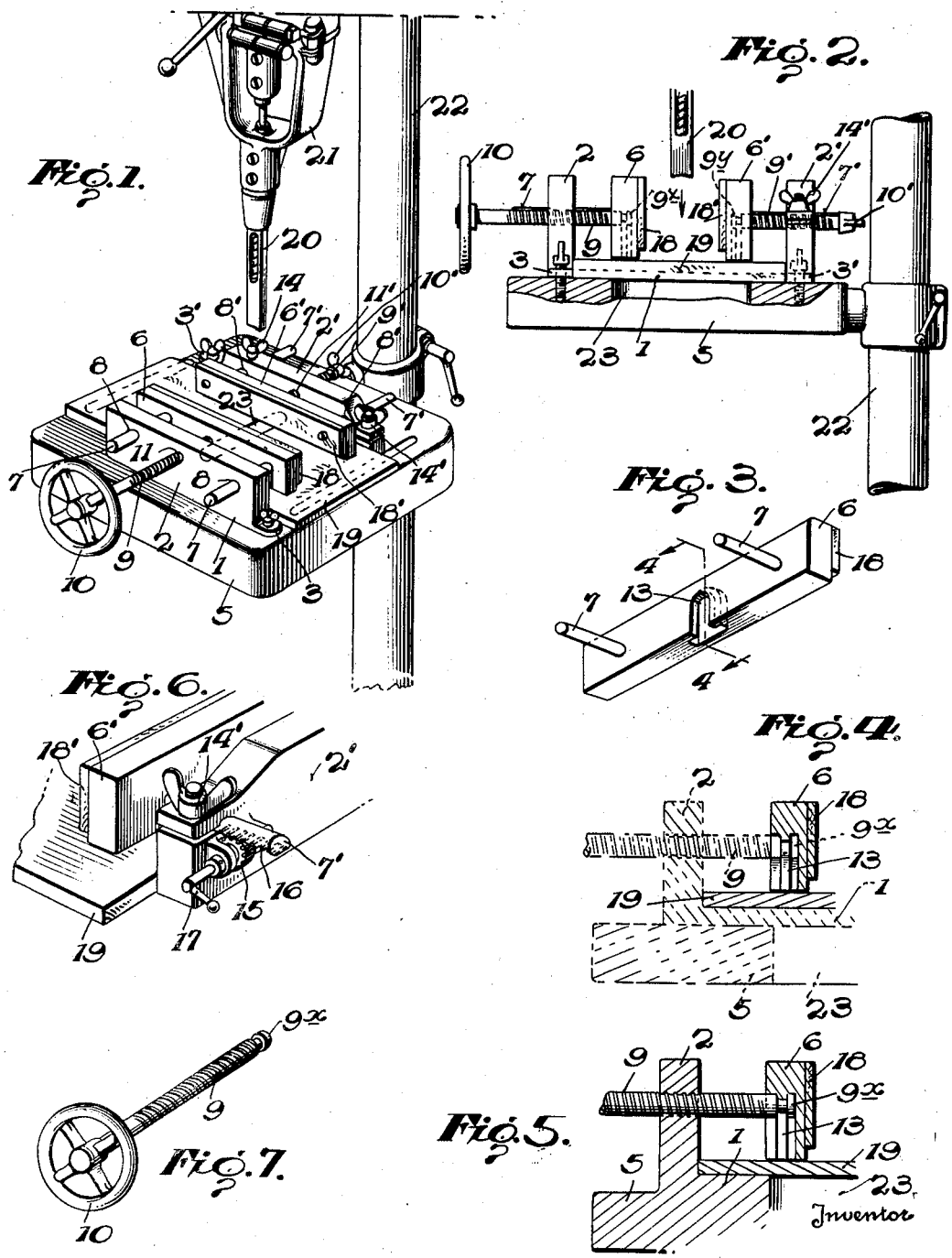

2,214,663

UNITED STATES PATENT OFFICE 2,214,663

WORK HOLDER

Edward Bradley Dewey, Washington, D. C.

Application April 4, 1940, Serial No. 327,919

15 Claims. (Cl. 77—63)

The object of my invention is to provide a work holding unit for a drill press so that it may be readily converted into a simple and efficient mortising machine, which is simple in construction and inexpensive to manufacture and will hold the work securely in place, locking and unlocking the work with a quarter turn of a hand wheel.

My invention may be quickly adjusted for work of different sizes and when adjusted has the quick smooth action of a production machine.

In the operation of my machine the rear guide is adjusted so as to bring the work under the hollow chisel in the correct position and locked in place. The forward guide is then moved towards the work by means of the hand wheel and locks the work securely in position. After the first cut has been made the work is released by a quarter turn of the hand wheel and moved into position for the second cut and the operation is repeated until the mortise has been completed.

My invention can be made either as a separate unit to be clamped on the table of a drill press, or can be made with an extension and collar to fit the upright of the drill press, so that it is a permanent fixture and will swing to one side out of the way when not in use.

My work holder may be made of any metal, preferably of cast iron, and I reserve the right to make such changes that will facilitate the manufacture of my invention as long as I do not deviate from the principles of my invention.

The objects and advantages of my invention will appear from the following description and accompanying drawing in which similar numbers refer to similar parts in the several views.

Figure 1 is a perspective view of the work holder mounted on a drill press table showing mortising attachment and hollow chisel.

Figure 2 is a vertical side view of Figure 1 with parts of the table broken away.

Figure 3 is an underside perspective view of one of the movable guides.

Figure 4 is a sectional view on the line 4—4, Fig. 3, looking in the direction of the arrows, with the table and associated parts shown in dotted lines.

Figure 5 is a similar view of Figure 4 showing another form of construction with the stationary uprights of the work table made in one unit.

Figure 6 is a fragmentary detail of a hand geared control for feeding the guides in and out.

Figure 7 is a detail of the clamping screw with hand wheel attached and locking swivel on end of screw.

In Figure 1 of my work holder, 1 is a base with parallel vertical sides 2 and 2' and with lugs 3 and 3' for attaching the base to the table of a drill press 5.

6 and 6' are movable members with guide rods 7 and 7' attached thereto sliding through holes 8 and 8' in the vertical sides of base plate 2 and 2'. 9 is a screw with wheel 10 passing through a bore 11 in side member 2, which bore is threaded to receive screw 9, and said screw is attached to member 6 by means of a knob 9x on its end engaging an undercut slot 13 (Figure 3) in the member 6 extending upwardly from its lower edge so that said screw may rotate freely in the slot 13 as hand wheel 10 is whirled. The opposed member 6' is similarly provided with an undercut slot similar to slot 13 of member 6 receiving a knob 9y on the end of a screw 9' threaded in a bore 11' in the opposite side 2' of the holder, said screw having a wing nut 10' on its outer end for rotating the shaft 9'. The ends of wall 2' are split across the bores 8' for rods 7' (Figure 6) and thumb bolts 14, 14' are provided through the split portions to contract the bores 8' around the rods 7' to serve as a means for locking member 6' securely in position after it has been adjusted by the screw 9'.

Guide rods 7, 7' of the respective members 6, 6' are of such length that when the members are both disposed adjacent the same wall 2 or 2', the rods of the member farthermost removed from its respective wall, will clear the related bores 8 or 8', whereby that member may be removed from the assembly by merely lifting same from the base, the knob 9x or 9y of the related screw 9 or 9' sliding out of the bottom of slot 13 as the member is raised, thereby freeing the said member from the screw 9 or 9'.

In place of screw 9' I may provide gears 15 (Figure 6) on side 2' meshing with racks 16 formed in guides 7', said gears 15 being rotatable by means of handles 17 when clamps 14 and 14' are loosened.

18 and 18' are removable facing strips fastened to the opposed faces of members 6 and 6' to keep said members from scarring or marring the work when clamped between same. 19 is a removable cover for the base preferably of wood, extending beyond the sides of the base 1 in case a longer support is needed under the work.

21 is the mortising attachment attached to the drill press, and 20 the hollow chisel of said press. 23 is a slot in the base 1 of the holder to allow the chisel 20 to pass therethrough and through the usual hole in table 5 to protect the chisel.

Obviously numerous modifications are possible and I contemplate as within the scope of my invention as defined in the appended claims all such alternative and equivalent structures.

I claim:

1. A work holder comprising a base having spaced parallel upstanding walls, opposed members between the walls movable on axes normal to said walls; and means for moving the said members comprising rods extending through the walls and connecting the respective members; said connections comprising knobs on the ends of said rods and undercut slots extending inwardly from edges of the members.

2. A work holder comprising a base having spaced parallel upstanding walls, opposed members between the walls movable on axes normal to said walls, said members carrying guide rods extending from their faces adjacent the walls and slidably engaging bores in their respective walls of the base; and means for moving the said members.

3. In a work holder as set forth in claim 2, said rods being of length to clear the bores when their related members are in positions farthermost removed from their related walls.

4. In combination with a work holder as set forth in claim 2, means for locking one member in adjusted position, comprising split portions in said wall across the bores for said rods of the related member, and means for contracting the bores around the rods.

5. In combination with a work holder as set forth in claim 2, said rods being of length to clear the bores when their related members are in positions farthermost removed from their related walls; means for locking one member in adjusted position comprising split portions in said wall for the rods of the related member, and means transfixing said split portions to contract said bores around the rods.

6. In a work holder as set forth in claim 2, said moving means for one member comprising pinions rotatably mounted on the related wall and meshing with racks formed in the rods.

7. In a work holder as set forth in claim 2, said rods being of length to clear the bores when their related members are in positions farthermost removed from their related walls; and said moving means for one member comprising pinions rotatably mounted on the related wall and meshing with racks formed in the rods.

8. In a work holder as set forth in claim 2, said moving means comprising screw shafts threaded through the walls of the base and connecting the respective members; said connections comprising knobs on the ends of said screws and undercut slots extending upwardly from the bottoms of the members.

9. A work holder comprising a base having spaced parallel walls, opposed members between the walls movable on axes normal to said walls, said members having guide rods thereon slidably engaging bores in their respective walls, and said rods being of length to clear the bores when their related members are in positions farthermost removed from their related walls, screw shafts threaded through the walls and engaging the respective members; and means for locking one member in adjusted position.

10. In a work holder as set forth in claim 9, said screws having knobs on their ends and undercut slots extending upwardly from the bottoms of the members receiving the knobs to facilitate disengagement of the screws and members.

11. In a work holder as set forth in claim 9, said locking means comprising split portions in said wall across the bores for said rods of the related member, and means transfixing said split portions to contract said bores around the rods.

12. A work holder comprising a base having spaced parallel walls, opposed members between the walls movable on axes normal to said walls, said members having guide rods thereon slidably engaging bores in their respective walls, moving means for one member comprising pinions rotatably mounted on the related wall and meshing with racks formed in the guide rods of the related member; means for locking said member in adjusted position; and moving means for the other member comprising a screw shaft threaded through the related wall and engaging the related member.

13. In a work holder as set forth in claim 12, said rods being of length to clear the bores when their related members are in positions farthermost removed from their related walls.

14. In combination with a work holder as set forth in claim 12, means for locking one member in adjusted position, comprising split portions in said wall across the bores for said rods of the related member, and means for contracting the bores around the rods.

15. In a work holder as set forth in claim 12, said screw shaft having a knob on its end engaging an undercut slot extending upwardly from the bottom of the related member to facilitate disengagement of the screw and member.

EDWARD BRADLEY DEWEY.